United States Patent
Noll et al.

(10) Patent No.: US 10,761,324 B2
(45) Date of Patent: Sep. 1, 2020

(54) METHOD FOR UNCOVERING A BRANCH IN A PIPE SYSTEM BY VIRTUAL PROJECTION THEREOF

(71) Applicant: PIPETRONICS GMBH & CO. KG, Rohrbach (DE)

(72) Inventors: Christian Noll, Limburgerhof (DE); Herbert Wind, Albersweiler (DE)

(73) Assignee: PIPETRONICS GMBH & CO. KG, Rohrbach (DE)

( * ) Notice: Subject to any disclaimer, the term of this patent is extended or adjusted under 35 U.S.C. 154(b) by 0 days.

(21) Appl. No.: 16/087,038

(22) PCT Filed: Mar. 22, 2017

(86) PCT No.: PCT/DE2017/100233
§ 371 (c)(1),
(2) Date: Sep. 20, 2018

(87) PCT Pub. No.: WO2017/162240
PCT Pub. Date: Sep. 28, 2017

(65) Prior Publication Data
US 2019/0107715 A1 Apr. 11, 2019

(30) Foreign Application Priority Data
Mar. 24, 2016 (DE) .................. 10 2016 105 639

(51) Int. Cl.
*F16L 41/02* (2006.01)
*G02B 27/01* (2006.01)
(Continued)

(52) U.S. Cl.
CPC ...... *G02B 27/0103* (2013.01); *B29C 63/0013* (2013.01); *F16L 41/02* (2013.01);
(Continued)

(58) Field of Classification Search
CPC ........ G02B 27/0103; G02B 2027/0138; B29C 63/0013; B29C 63/34; B29C 2793/0018;
(Continued)

(56) References Cited

U.S. PATENT DOCUMENTS

| | | | | |
|---|---|---|---|---|
| 4,577,388 A | * | 3/1986 | Wood | B23D 21/02 166/55 |
| 5,044,824 A | * | 9/1991 | Long, Jr. | E03F 3/06 156/287 |

(Continued)

FOREIGN PATENT DOCUMENTS

| | | |
|---|---|---|
| DE | 3912205 A1 | 10/1989 |
| GB | 2092493 A | 8/1982 |
| WO | WO 2017/162240 A1 | 9/2017 |

OTHER PUBLICATIONS

The International Bureau of WIPO, International Preliminary Report on Patentability in International Application No. PCT/DE2017/100233 (dated Sep. 25, 2018).

(Continued)

*Primary Examiner* — Benjamin F Fiorello
(74) *Attorney, Agent, or Firm* — Neal, Gerber & Eisenberg LLP; Thomas E. Williams; Daniel Organ

(57) ABSTRACT

The present invention relates to a method for uncovering a branch of a pipe system that is renovated with a lining tube, comprising the following steps, in particular in this sequence:
a) providing an uncovering device in the renovated pipe and arranging the uncovering device in front of the branch to be uncovered;
b) virtually representing for a user the branch that is concealed by the lining tube; and
c) uncovering the branch by the user by means of the uncovering device, based on the virtual representation.

9 Claims, 2 Drawing Sheets

Figure 1:
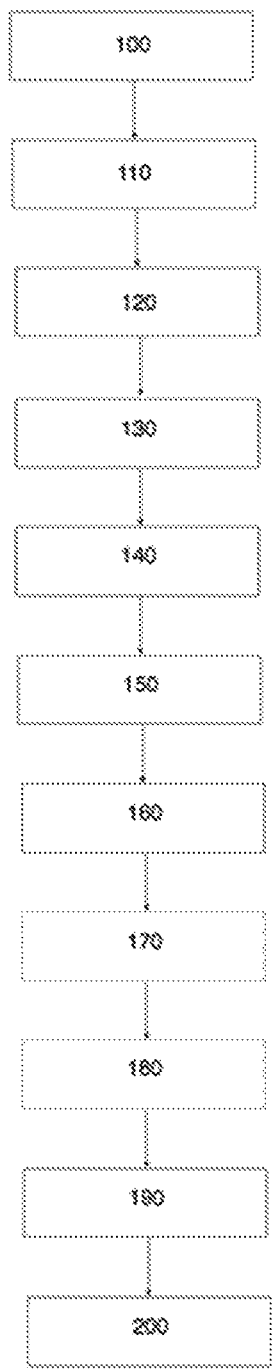

(51) Int. Cl.
  *B29C 63/00* (2006.01)
  *F16L 55/48* (2006.01)
  *F16L 55/179* (2006.01)
  *E03F 3/06* (2006.01)
  *B29C 63/34* (2006.01)

(52) U.S. Cl.
  CPC .............. *F16L 55/48* (2013.01); *B29C 63/34* (2013.01); *B29C 2793/009* (2013.01); *B29C 2793/0018* (2013.01); *E03F 2003/065* (2013.01); *F16L 55/179* (2013.01); *G02B 2027/0138* (2013.01)

(58) Field of Classification Search
  CPC .... B29C 2793/009; F16L 41/02; F16L 55/48; F16L 55/179; E03F 2003/065
  See application file for complete search history.

(56) References Cited

U.S. PATENT DOCUMENTS

| | | | | |
|---|---|---|---|---|
| 5,153,718 A | * | 10/1992 | Masser | E21B 29/06 166/55.2 |
| 5,368,423 A | * | 11/1994 | Hanna | B23C 3/00 166/55.7 |
| 5,577,864 A | * | 11/1996 | Wood | F16L 55/179 405/184.2 |
| 5,960,882 A | * | 10/1999 | Polivka | F16L 55/265 166/297 |
| 6,058,978 A | | 5/2000 | Paletta et al. | |
| 7,073,979 B2 | * | 7/2006 | McGrew | E03F 3/06 166/298 |
| 8,024,066 B2 | * | 9/2011 | Reverte | E03F 7/10 318/568.16 |
| 8,170,715 B1 | * | 5/2012 | Vallapuzha | F16L 55/265 138/97 |
| 9,512,952 B2 | * | 12/2016 | Rogers | F16L 55/265 |

OTHER PUBLICATIONS

The International Bureau of WIPO, International Search Report in International Application No. PCT/DE2017/100233 (dated Jun. 7, 2017).

The International Bureau of WIPO, Written Opinion of the International Searching Authority in International Application No. PCT/DE2017/100233 (dated Jun. 7, 2017).

\* cited by examiner

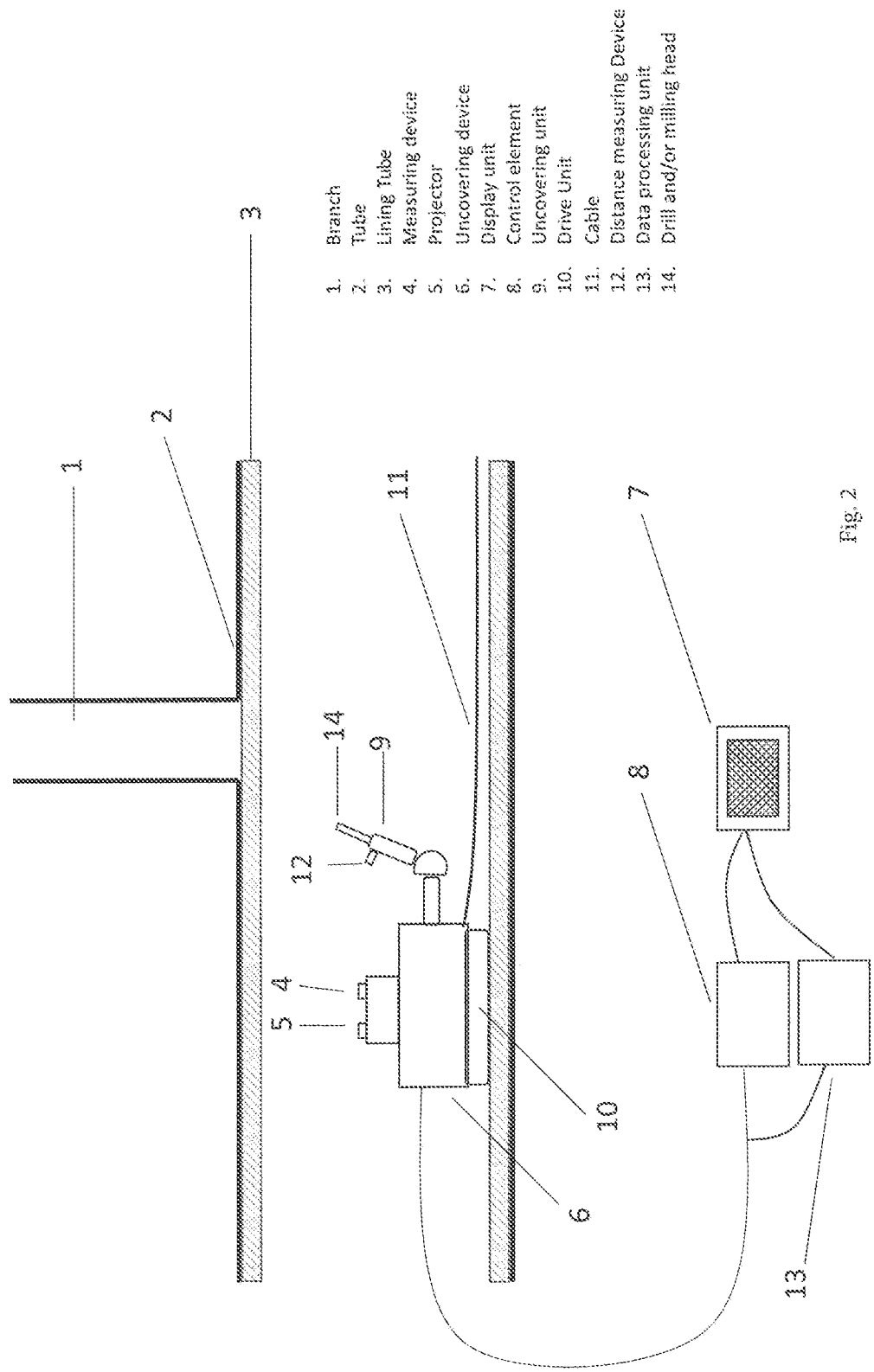

METHOD FOR UNCOVERING A BRANCH IN A PIPE SYSTEM BY VIRTUAL PROJECTION THEREOF

The present invention relates to a method for uncovering a branch in a pipe system by virtual projection thereof.

For inspection, maintenance, and renovation of pipes, duct systems, and the like, devices are often inserted into the pipes in order to carry out the necessary measuring operations and/or mechanical renovation activities. For measuring the actual situation of a pipe, the devices usually have camera systems for visualizing the condition of the pipe.

If a defect or damage is recognized, the section of the pipe system in question may be replaced by new sections. However, this is generally very complicated.

Alternatively, methods are known in the prior art in which for renovating pipe systems, for example ducts and similar piping systems, a flexible, curable layer that is impregnated with a curable resin, used as a lining tube (also referred to as a liner), is inserted into the pipe system. After the insertion, the lining tube is expanded so that it lies tightly against the inner wall of the pipe system. The resin is subsequently cured.

The manufacture of this type of lining tube is described in WO 95/04646, for example. According to the known methods, preferably unsaturated polyester resins or vinyl ester resins, which can be dissolved in styrene and/or an acrylic ester, for example, are used as curable resins. These unsaturated polyesters or vinyl esters may be cured thermally (generally using peroxide catalysts) or by radiation, for example via UV light with photoinitiators, as described in EP-A 23623, for example. In addition, so-called combination curing, with a peroxide initiator that is used for the thermal curing in combination with photoinitiators, is possible, and has proven advantageous in particular for large wall thicknesses of the lining tubes. A method for such so-called combination curing is described in EP-A 1262708, for example.

A radiation-curing lining tube typically has an outer protective film that is impermeable to light, an inner film that is permeable at least to certain wavelength ranges of electromagnetic radiation, and a curable layer that is impregnated with a resin and situated between the inner film and the outer film. The outer film tube is intended to prevent the resin, used for the impregnation, from escaping from the curable layer and into the environment. This requires good seal-tightness and bonding of the outer film tube to the resin-impregnated, curable layer.

Prior to the curing, the lining tubes are inserted into the pipe system to be renovated, and inflated by means of a fluid, generally compressed air. For inflating the lining tube, according to the prior art an opening end of the lining tube is acted on by compressed air, and the opposite opening end of the lining tube is closed with a closure device, a so-called packer. This closure device includes a hollow cylinder and a cover element with which the hollow cylinder may be closed.

For curing the lining tube, a curing device is inserted therein, the curing device having a radiation source and being guided through the lining tube in order to activate or carry out the curing of the curable layers of the lining tube by means of the radiation energy. Complete curing of the lining tubes is of great importance; i.e., a specified quantity of radiation energy must be introduced into the lining tube at every point on the lining tube. The quantity of radiation energy is a function of the power output of the radiation sources, and of the speed with which it is passed through the lining tube.

When such lining tubes are drawn into the pipe to be renovated, it is necessary to once again uncover the branches, closed by the lining tube, after the lining tube has cured. For this purpose, the position of the branches must be known as accurately as possible.

For detecting pipes by measurement, and in particular for determining the position of branches, according to the prior art measuring devices are typically inserted into the pipe before the lining tube is drawn in, the measuring device being moved through a pipe to be renovated either automatically, or with the aid of a cable, in particular a cable that includes Kevlar fibers and/or at least one traction cable, and/or a traction cable.

The measuring device according to the prior art detects the position of the branches prior to drawing in the lining tube, typically via optical sensors, in particular camera recordings. In the following discussion, the term "branches" is understood in a broad sense, and includes side inlets, also referred to as pipe inlets or pipe branches. When a branch is recognized, either a speed sensor, which counts the number of revolutions of the wheels of the measuring device, which measures the length of the [omission in source text] for moving the cable or traction cable, or a measuring tape that is carried along by the curing device is used for determining the position of the branch in the pipe.

However, the position of the branch must be detected with regard not only to its distance from one or both opening ends of the pipe, but also in its angular position. Rotation angle sensors or gravity sensors, for example, are used for this purpose.

It is problematic that the position of the branch must be determinable in a reproducible manner. After the lining tube is drawn in and cured, an uncovering device is inserted into the pipe. This uncovering device is now moved to the detected position of the recess. The uncovering device is then manually controlled by a user in order to uncover the branch.

Thus, for a pipe that is renovated with a lining tube, the user must always uncover a branch that is concealed by the lining tube, and therefore not visible. One problem with such uncovering is that, although the position of the branch, and optionally its angular position relative to the uncovering device, is displayed to the user according to the prior art, without further technical aids the user must independently control the uncovering. Thus, the user only learns, for example, that at an angle of 30° a circular branch having a diameter of 80 cm, for example, should be present.

Thus, in the known methods and devices it is disadvantageous that such uncovering is very susceptible to manual operating errors. Imprecise uncovering of the branch may very easily result in damage to same, in that the milling head often used for uncovering causes damage to the wall of the branch, thus requiring time-consuming, costly repairs. A second problem is that the branch may possibly not be uncovered over its full circumference, so that, in particular in the event of incomplete uncovering in the lower area, blockages and accumulations of or by liquids may occur. This is likewise undesirable.

The object of the present invention, therefore, is to overcome the disadvantages of the prior art, and in particular to allow a user to precisely uncover branches in pipes that are renovated with lining tubes.

This object is achieved by a method for uncovering a branch of a pipe system that is renovated with a lining tube, comprising the following steps, in particular in this sequence:
a) providing an uncovering device in the renovated pipe and arranging the uncovering device in front of the branch to be uncovered;
b) virtually representing for a user the branch that is concealed by the lining tube; and
c) uncovering the branch by the user by means of the uncovering device, based on the virtual representation.

According to the invention, it is advantageous that a virtual representation of the recess concealed by a lining tube is displayable to a user. Such a virtual representation of a branch allows the user to manually detect the dimensions of the concealed branch and precisely uncover it.

Instead of displaying solely the position of the branch and parameters for its geometry, according to the prior art, it is possible according to the invention for the virtual representation to be traversed by means of the uncovering device, so that operating errors may be minimized.

Precise uncovering of the branch concealed by the lining tube, over the full circumference of the branch, is thus possible without the branch itself being damaged, or failing to be uncovered over its full circumference. Subsequent corrections, such as repair operations or manual removal of undesirable lining tube areas, are thus minimized or eliminated altogether.

The virtual representation according to the invention may take place in various ways. On the one hand, it may be provided that the outer ends of the area of the branch to be uncovered are represented by means of a circumferential line. This may take place, for example, in the form of a circular projection onto the lining tube, either directly on the lining tube and/or as a virtual superimposition of a camera image, in particular in real time. Such a line would then represent a virtual boundary of the uncovering operation, in which the user recognizes that he/she must travel along this line with an uncovering device.

On the other hand, it may be provided that the entire area of the lining tube to be uncovered is visually highlighted, for example by a full-surface virtual representation of the branch or by crosshatching of the branch, or the like. Such a virtual representation may be provided in a single color or in multiple colors, for example highlighted in a different color in the critical border areas than in the areas further to the center, where damage to the branch is less likely.

According to the invention, it is thus possible for the first time to visualize for a user a branch that is concealed by a lining tube, so that its location, position, and dimensions may be used as the basis for controlling the uncovering.

The term "branch" as used below may preferably be understood in a broad sense, and does not refer solely to the branch pipe as such. As stated above, the transition between a (main) pipe and a branch may be broken out in sections or over its full circumference. In this case, it may be provided in particular that the virtual representation of the branch is not limited to the branch per se, and instead also includes the broken-out areas; i.e., the cut edge of the wall/(main) pipe and the entry of the branch/breakouts are encompassed by the virtual representation. For complete uncovering of the branch, in particular in the case that the lining tube includes an outer film, it may be advantageous for the lining tube to be uncovered at the stated cut edge. It may thus be ensured that the film is completely removed.

In summary, according to one embodiment it may therefore be provided that a virtual representation of the branch takes place. Alternatively, it may be provided that the virtual representation includes not only the branch, but also the breakouts associated with the branch. In both embodiments, the cut edge of the pipe that is renovated with the lining tube, and the branch, optionally including the stated breakouts, are preferably displayed as a virtual representation.

It may be advantageous in particular that the virtual representation in step b) takes place by projecting the virtual representation onto the lining tube and/or by displaying the virtual representation on a display device, in particular as a superimposition of a camera image, preferably in real time.

According to one embodiment, it has proven advantageous that the virtual representation is projected directly onto the lining tube, where it may be directly detected by the user or by means of a camera system, and is subsequently displayed on a display unit, which the user observes from a different location in order to control the uncovering device. Alternatively or additionally, it may be provided that the virtual representation, in particular superimposed in real time with a recording by a camera system in the renovated pipe, is displayed only on a display unit that is used by a user for controlling.

In the latter case of superimposing an actual camera recording on the virtual representation of the branch, a so-called "augmented reality" method is provided in which actual images containing additional information are superimposed. By displaying the virtual additional information, in the present case the virtual representation of the branch, assistance which is very intuitive for the user may be provided for uncovering the branch. The user may virtually see through the lining tube, and thus carry out the necessary work steps in a targeted manner.

Within the meaning of the present invention, pipe systems are understood to mean pipe systems of any type for transporting liquid or gaseous media, which may be operated under negative pressure, standard pressure, or positive pressure. Examples of such are pipelines of any type, pipeline systems for transporting media in chemical plants and production facilities, pressure pipes such as pressurized water pipes and drinking water pipes, and in particular also wastewater systems, which are laid underground, i.e., are not visible. Use of the illumination means according to the invention for curing lining tubes is also particularly suited for renovation of such wastewater pipes in duct systems.

In addition, according to one embodiment it may be provided that the method further comprises the following steps, in particular before step a):
d) detecting the position of a branch in the pipe system, before drawing in the lining tube, by measurement by means of a measuring device, or inputting the position by means of an input unit; and
e) storing the position of the branch in a data processing device.

To be able to display a virtual representation of the position of the branch to a user, its position in the pipe system must be known. Such a position may be input by a user, and/or it may be provided that the position of the branch is detected by measurement before the lining tube is drawn in. Methods from the prior art for determining a position of a branch in a pipe system are known to those skilled in the art. This includes in particular the position of a branch in the lining tube with regard to an opening end of the pipe system and its angle in the pipe system relative to the uncovering device.

Furthermore, it may be preferred that the method comprises the following steps, in particular before, with, or after step d) or step e):

f) detecting at least one feature of the geometry of a branch by measurement by means of the measuring device; or g) selecting at least one feature of the geometry of a branch from a database containing geometries of branches; and h) storing the at least one feature of the geometry of the branch in a data processing unit.

In addition to the position of the branch, at least one parameter of the geometry itself may either be detected by measurement or may be input.

In particular, the parameter may include a diameter of the branch, as well as its general external shape and other characteristics.

According to one embodiment of the present invention, detection of a branch by measurement may be particularly advantageous, in particular when the branch has damage. For example, such a detection by measurement may take place by means of a light field camera, by means of a conventional camera, or by means of laser scanning, as well as other technologies. In particular damage such as breakouts, cracks, and the like may be identified in advance by precise detection of the branch. This actually detected actual situation may then preferably be stored in the data processing unit and subsequently used as the basis for the virtual representation of the branch.

Such a detection of damage is accompanied by the advantage that an actual virtual representation of the branch is possible according to the invention. Thus, not only the ideal target configuration of the branch, but also its actual state is optionally displayed to the user.

According to the prior art it is known, for example, that initially a first milling of an area of the lining tube, behind which a branch to be uncovered is presumed, takes place. A distance measurement then takes place for the space behind the lining tube in the branch in order to determine the distance of the uncovering unit from the inner wall of the branch.

If a breakout of the branch is now present in the area in which the distance from the inner wall is to be determined, this measurement is erroneous. If an uncovering of the branch is subsequently carried out based on this erroneous measurement, unintentional damage is to be expected. The same applies for the case that an incorrect distance is determined due to water or silt accumulations in the lower area of the branches.

By now displaying to the user a virtual representation of the actual branch, such erroneous uncovering operations may be prevented, since the user is familiar with the actual situation.

Furthermore, it may be preferred that the method further comprises the following steps, in particular before step b):

i) creating a virtual representation of the branch by reading out at least one feature of the geometry of the branch from the data processing unit;

j) reading out the position of the branch from the data processing unit; and k) virtually representing the branch based on the at least one feature of the geometry and the position.

As stated above, such a virtual representation of the branch is advantageous for several reasons. The virtual representation may preferably take place in the form of an "augmented reality" in which the actual configuration of the branch, which is concealed by the lining tube and is superimposed with an image from a camera system that is recorded in real time, is virtually displayed to the user on a display unit.

In addition, according to one embodiment of the invention it may be provided that the virtual representation of the branch includes not only an image as a representation of the branch itself, but also additional information, for example in the form of pictograms and/or text and/or graphical explanations.

Such additional information may include, for example, a diameter of the branch, in particular in cm or mm, or some other dimensional parameter, the material of the branch, a recommended uncovering tool, for example a suitable milling head, recommended uncovering speeds and directions, and the like. This is additional information that may assist a user in uncovering a branch.

In addition, according to one embodiment according to the invention it may be preferred that the following steps are included, in particular before or after step b) or before or after step i):

l) moving the uncovering device to the position of the branch;

m) uncovering a segment of the branch that is spaced apart from the edge of the branch, in particular in the area of the midpoint of the branch, by means of an uncovering unit;

n) detecting the position of the uncovering unit of the uncovering device relative to the inner wall of the branch;

o) updating the position of the branch by means of the detected position of the uncovering device relative to the branch; and p) displaying the updated virtual representation of the branch.

As stated above, in practice it may be difficult to proceed toward the exact position of a branch via an uncovering device. This may be caused by an inexact measurement of the branch, a deviation in the exact position of the branch from existing plans, or an incorrect detection of the position of the uncovering device itself, in which either the position of a measuring unit and/or the position of the uncovering device are/is inaccurately determined.

According to the invention, it may therefore be advantageous to initially uncover a segment of the branch. Such uncovering of a segment may preferably take place in the middle or in the vicinity of the middle of the branch, so that inaccuracies in the positioning of the uncovering device do not result in direct damage to the wall of the branch, or the risk of such damage is minimized.

Based on such an uncovered segment of the branch, the exact position of the walls of the branches may then be detected, which forms the basis for the virtual representation of same in the subsequent steps. According to one embodiment of the present invention, it is of course also provided that initially the branch is displayed as a virtual representation, and the stated virtual representation is subsequently updated, based on the position of the branch relative to the uncovering device, which is updated in step o).

It may also be provided that the data processing unit is designed and configured for controlling or regulating the position of the uncovering device, so that in particular autonomous uncovering of branches, based on data generated by the evaluation unit, can take place.

Such an automated uncovering may be advantageous, since it further minimizes manual operating errors. Due to the projection of the virtual branch, the user may detect at any time whether uncovering is taking place along the intended sections of the lining tube.

It may also prove to be advantageous when uncovering of the branch takes place in a (semi-)automated manner. It may be preferred that a path according to which an automatic uncovering is to take place is displayed to a user. This path may subsequently be optionally adapted and changed by a user, by the user making appropriate inputs to an input unit. This may take place, for example, by changing the proposed path by means of a computer mouse, in that the uncovering path is traced or shifted by means of the mouse. Of course, other input methods for changing the path are conceivable, and are not excluded by the stated example. After final approval of the stated path, automatic uncovering of the branch then takes place.

In addition, according to one embodiment it may be preferred that the user makes changes to the uncovering path during the automated uncovering. In this case, the user manually intervenes in the automated uncovering, the manual interventions being superimposed with the automated uncovering. After the manual interventions are completed, the automated uncovering may optionally be automatically continued, or it may be provided that the automated uncovering must be activated by an input.

Furthermore, it may be preferred that the uncovering device, designed and configured as an uncovering unit, includes a drilling and/or milling head in order to uncover at least one branch by removing the lining tube, at least in sections.

In addition, according to one embodiment of the present invention it may be advantageous that the uncovering unit of the uncovering device is situated on a movable end of a robot arm that is movable in at least two, in particular three, spatial axes, and that is in particular retractable and/or includes at least one telescoping arm element.

Recesses at any location on a pipe may be reached via a movable uncovering device according to the invention. A retractable and/or partially telescopically extendable robot arm allows a compact design of the device according to the invention.

According to one embodiment of the present invention, it is preferred that the uncovering device includes a drive unit, and in particular at least one wheel that is in, or may be brought into, operative connection with the drive unit.

An uncovering device according to the invention may be moved through a pipe to be renovated either automatically, or with the aid of a cable, in particular a cable that includes Kevlar fibers and/or at least one traction cable, and/or a traction cable. In the present case, however, it may be particularly advantageous when the uncovering device is in, or may be brought into, operative connection by means of an integrated or external drive device, which may be controlled in particular by a control unit of the measuring device, thus enabling automated detection and uncovering.

Furthermore, it is preferred that a measuring device for measuring the distance between the uncovering unit and the inner wall of a branch of the uncovering device is included, in particular situated on the uncovering unit or adjacent to the uncovering unit.

Such a distance measuring unit must precisely determine the relative position of the uncovering device with respect to a branch.

Lastly, it may be provided that the virtual representation of the branch concealed by the lining tube takes place separately from the uncovering device, in particular adjacent to a control element, situated separately from the uncovering unit, for controlling the uncovering device.

It may often be advantageous for an uncovering device to be controlled outside the pipe system by a user. It may be advantageous when the virtual representation of the branch takes place spatially separately on a display unit that is situated next to a control element for controlling the uncovering device.

Further features and advantages of the invention result from the following description, in which one exemplary embodiment of the invention is explained by way of example with reference to one schematic drawing, without thereby limiting the invention.

In the figures:

FIG. 1: shows a schematic flow chart of one exemplary embodiment of a method according to the invention.

FIG. 2: shows various structural features of embodiments of the present disclosure.

One embodiment of a method according to the invention is described below. In a first method step 100, before the lining tube is drawn in, the position of a branch in the pipe system is initially detected by measurement by means of a measuring device or an input of the position of the branch by means of an input unit. The position of the branch is subsequently stored in a data processing device.

Concurrently or subsequently, in a method step 110 at least one feature of the geometry of the branch is detected by measurement, or at least one feature of the geometry of the branch is selected and/or input from a database containing geometries of branches. The feature of the geometry of the branch is subsequently stored in the data processing device.

Subsequently, in a step 120 an uncovering device is provided in the renovated pipe and arranged in front of the branch to be uncovered. In a step 130, a virtual representation of the branch is created by reading out the at least one feature of the geometry of the branch from the data processing unit. In a step 140, the position of the branch is then read out from the data processing unit, and the virtual representation of the branch, based on the at least one feature of the geometry and the position of the branch, is displayed in a step 150.

In a step 160 the uncovering device is now moved to the position of the branch, and in a step 170, optionally a segment of the branch spaced apart from the edge of the branch is initially uncovered. By means of this uncovered segment, in a likewise optional step 180 the position of the uncovering unit relative to the inner wall of the branch is determined, and the position of the branch of the uncovering unit relative to the branch is optionally updated.

The optionally updated position of the branch as a virtual representation of the branch concealed by the lining tube is then displayed to the user by displaying a virtual representation of same on a display device in a step 190.

Lastly, in a step 200 the branch is uncovered by means of the uncovering device, based on the virtual representation by the user.

FIG. 2 illustrates the structural features described above in this disclosure. FIG. 2 illustrates a branch 1, a tube 2, a lining tube 3, a measuring device 4, a projector 5, an uncovering device 6, a display unit 7, a control element 8, an uncovering unit 9, a drive unit 10, a cable 11, a distance measuring device 12, a data processing unit 13, and a drill and/or milling head 14.

The features of the invention disclosed in the preceding description and in the claims may be important, alone or also in any given combination, for implementing the invention in its various embodiments.

The invention claimed is:

1. A method for uncovering a branch of a pipe system that is renovated with a lining tube, comprising the following steps, in this sequence:

a) providing an uncovering device in the renovated pipe and arranging the uncovering device in front of the branch to be uncovered;
b) virtually representing for a user the branch that is concealed by the lining tube by projecting a virtual representation onto the lining tube or by displaying the virtual representation on a display device, as a superimposition of a camera image, in real time; and
c) uncovering the branch by the user by means of the uncovering device, based on the virtual representation.

2. The method according to claim 1, further comprising the following steps, before step a):
d) detecting the position of a branch in the pipe system, before drawing in the lining tube, by measurement by means of a measuring device, or inputting the position by means of an input unit; and
e) storing the position of the branch in a data processing device.

3. The method according to claim 2, further comprising the following steps, before, with, or after step d) or step e):
f) detecting at least one feature of the geometry of a branch by measurement by means of the measuring device; or
g) selecting at least one feature of the geometry of a branch from a database containing geometries of branches; and
h) storing the at least one feature of the geometry of the branch in a data processing unit.

4. The method according to claim 1, further comprising the following steps, before step b):
i) creating a virtual representation of the branch by reading out at least one feature of the geometry of the branch from the data processing unit;
j) reading out the position of the branch from the data processing unit; and
k) virtually representing the branch based on the at least one feature of the geometry and the position.

5. The method according to claim 1, further comprising the following steps, before or after step b) or before or after step i):
l) moving the uncovering device to the position of the branch;
m) uncovering a segment of the branch that is spaced apart from the edge of the branch, in particular in the area of the midpoint of the branch, by means of an uncovering unit;
n) detecting the position of the uncovering unit of the uncovering device relative to an inner wall of the branch;
o) updating the position of the branch by means of the detected position of the uncovering device relative to the branch; and
p) displaying the updated virtual representation of the branch.

6. The method according to claim 1, characterized in that a data processing unit is designed and configured for controlling or regulating the position of the uncovering device, so that autonomous uncovering of branches, based on data generated by the evaluation unit, can take place.

7. The method according to claim 1, characterized in that the uncovering device, designed and configured as an uncovering unit, includes a drilling or milling head in order to uncover at least one branch by removing the lining tube, at least in sections.

8. The method according to claim 1, characterized in that a measuring device for measuring the distance between the uncovering unit and an inner wall of a branch of the uncovering device is included, situated on the uncovering unit or adjacent to the uncovering unit.

9. The method according to claim 1, characterized in that the virtual representation of the branch concealed by the lining tube takes place separately from the uncovering device, adjacent to a control element, situated separately from the uncovering unit, for controlling the uncovering device.

* * * * *